Dec. 15, 1953  A. J. WILCHEK  2,662,777
TWO WHEEL HAND CART
Filed Nov. 16, 1950
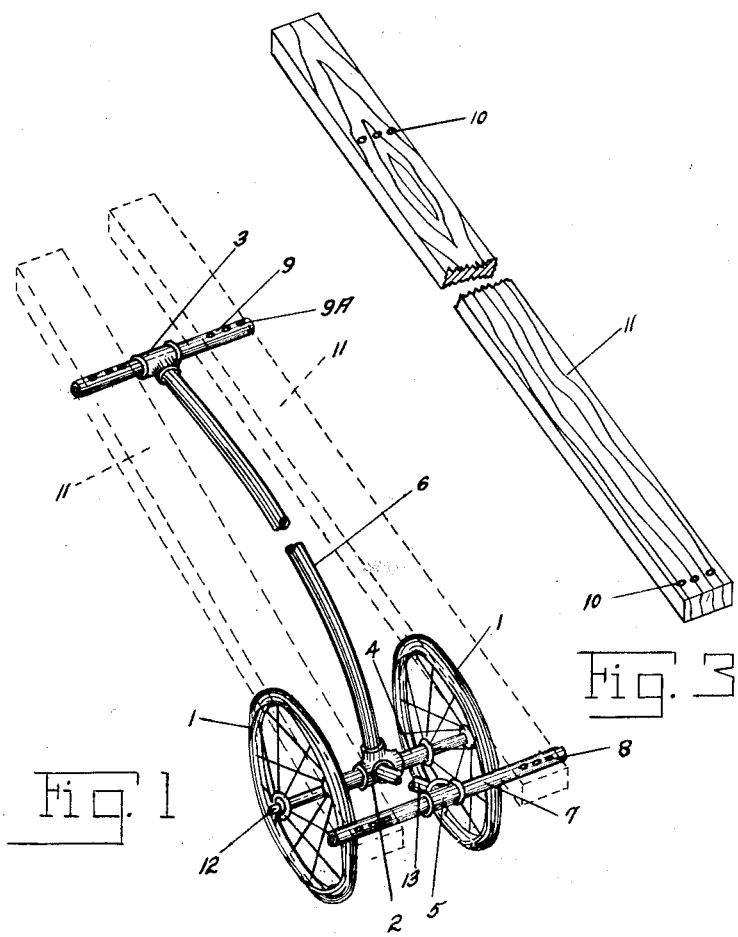
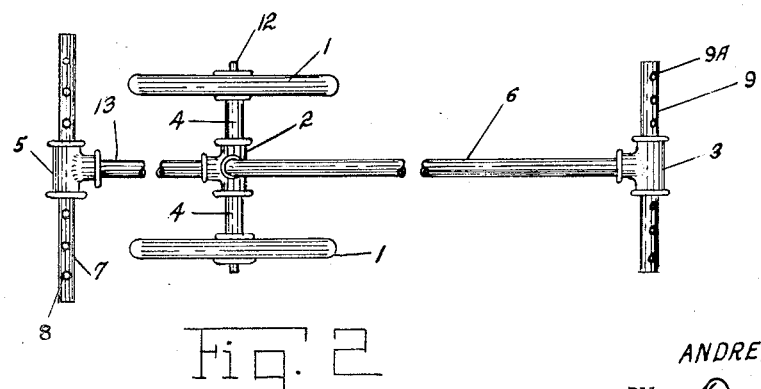
INVENTOR.
ANDREW J. WILCHEK Patented Dec. 15, 1953

2,662,777

UNITED STATES PATENT OFFICE 2,662,777

TWO WHEEL HAND CART

Andrew J. Wilchek, Cleveland, Ohio

Application November 16, 1950, Serial No. 196,015

2 Claims. (Cl. 280—47.24)

My invention relates to a new and novel improvement in vehicles for manual operation on sand.

One of the objects of this invention is to provide a land vehicle in the form of two wheels, preferably having rubber tires mounted rotatable on an axle, and having members fixed to such axle and extending therefrom at right angles to the axle, and a cross-bar attached through "a pipe T" on the outer end of each of said members as handles.

Another object of the invention is the provision of a vehicle as described above, in which the cross-bars or handles are adapted to have two lengths of timber attached parallel on them to form a structure for the easy and convenient hauling of the body of a slain deer or such like.

A further object and purpose of the invention is the provision of a vehicle of the type described previously, in which the ends of the timber most distant from the wheels are adapted when loaded, to contact the surface of the ground and act as a drag or brake when the vehicle is being moved down a grade or decline.

The foregoing stated objects and others attainable in the use of the device will be readily understood from a reading of the description, and a reference to the drawings in which:

Fig. 1 is a perspective view in elevation of the invention, with the handle extension in segment.

Fig. 2 is a plan view of the invention looking down on the top of same.

Fig. 3 is a perspective view of the timber in segment for fixing on the cross-bars or handles as outlined in Figure 1.

Describing the invention from the drawings:

The numeral 1 refers to the rubber tired wheels, with the collars 4, mounted rotatable on the axle 12; 6 and 13 are arm members, mounted on the axle 12 by means of the T2, and extending outward from the axle, 6 being the longer of such members, and in a slightly arched form. The outer end of the member 6 is provided with the T3 in which a cross-bar or handle 9, with openings 9A, is inserted and secured therein; the outer end of member 13 is provided with a T5, through which a cross-bar or handle 7, with openings 8 is inserted and secured, 11 are timbers with holes 10 for fixing on the cross-bars or handles 9 and 13 by means of a number of bolts through the holes 8 and 9A and engaging the holes 10 in the timbers 11.

The invention is preferably constructed by using rubber tired wheels with the collars 4 secured in the four way T2. The members 6 and 13 are likewise of tubing of required size. The cross bars or members 7 and 9 are of tubing and of a size adapted to be inserted in the T's 3 and 5, thus providing a frame of sufficient strength to bear and carry the weight of the body of a deer or other slain animal, as desired. When desired for use as stated, the cross-timbers 11 are fixed on the cross-bars or handles in the manner as shown in Figure 1. When the device is loaded with the body of a deer or such like, the cross-bar or handle 7 is accessible for use in pulling and guiding the device. With the device loaded as stated, the ends of the timbers farthest from the wheels will drag on the ground surface to provide a braking means for the loaded device when same is being drawn over a declining or down grade surface; however, when the device is being pulled on a level or upgrade surface, the timbers may be kept clear of such surface by means of the cross-bars or handles, if desired, without the timbers attached to the cross-bars or handles. The device has many other uses which will become apparent in the use of same.

It will be observed from the description and the drawing that my invention embodies new and novel features and while I have shown same in a desired and useful form and structure, adaptions in use may require modifications in form or structure, or both, without departing from the basic features or spirit of the invention.

What I claim and desire to secure by Letters Patent is:

1. A device of the type described comprising an axle, wheels supporting said axle horizontally and rotatably mounted on the opposite ends of said axle, elongated collars rotatably mounted on the said axle between said wheels, a first T mounted on said axle and having four openings, the inner end portions of said collars fixed in at least two of said openings in said first T, a first length of tubing having one end fixed in one of the said first T openings, said first length of tubing being slightly arched in its length, a second T secured to the outer end of said first tubing, a second length of tubing, a plurality of spaced openings extending longitudinally of said second tubing, said second length of tubing extending through and fixed to said second T, a third length of tubing having one end portion fixed in one of said first T openings opposite the first length of tubing and extending outwardly in a plane at a right angle to the plane in which the said first length of tubing extends, a third T secured to the outer end of said third length of tubing, a fourth length of tubing, a plurality of spaced apertures extending longitudinally of said fourth length of tubing, said fourth length of tubing extending through and fixed to said third T.

2. A device of the character described comprising an axle, wheels supporting said axle horizontally and rotatably mounted on the opposite ends of said axle, a T having four openings through two of which said axle extends and the other two of which have relatively divergent axes disposed in a plane normal to the axis of said axle, means positioning said T with such other two openings midway between said wheels, two lengths of tubing respectively having one end fixed in one of such other two openings so as to diverge relatively in such plane, and cross-pieces secured to the other ends of said two lengths of tubing, said cross-pieces each having a series of holes transversely therethrough, through which elongated wood pieces are adapted to be secured in spaced apart relation and in a plane normal to that in which said two lengths of tubing lie.

ANDREW J. WILCHEK.

References Cited in the file of this patent

UNITED STATES PATENTS

| Number | Name | Date |
| --- | --- | --- |
| 1,337,861 | Volle | Apr. 20, 1920 |
| 1,361,728 | Holdefer | Dec. 7, 1920 |
| 1,483,607 | Leidtke | Feb. 12, 1924 |
| 2,183,066 | Fields | Dec. 12, 1939 |
| 2,416,492 | Neely | Feb. 25, 1947 |
| 2,546,604 | Lafky | Mar. 27, 1951 |

FOREIGN PATENTS

| Number | Country | Date |
| --- | --- | --- |
| 14,653 | Great Britain | July 17, 1905 |
| 662,031 | France | Mar. 12, 1929 |